United States Patent [19]
Whitfield

[11] 3,814,929
[45] June 4, 1974

[54] LASER DATA TRANSMITTER WITH WIDE FREQUENCY BANDWIDTH

[75] Inventor: Edwin W. Whitfield, Great Neck, N.Y.

[73] Assignee: Sperry Rand Corporation, New York, N.Y.

[22] Filed: May 5, 1972

[21] Appl. No.: 250,782

[52] U.S. Cl. .............................................. 250/199
[51] Int. Cl. ............................................ H04b 9/00
[58] Field of Search ...... 250/199; 325/46, 185, 186; 332/18, 57, 59, 54, 63

[56] References Cited
UNITED STATES PATENTS

| | | | |
|---|---|---|---|
| 2,189,584 | 2/1940 | Hollman | 332/57 |
| 2,676,302 | 4/1954 | Webster | 332/57 |
| 3,321,714 | 5/1967 | Tien | 250/199 |
| 3,327,121 | 6/1967 | Thomas | 250/199 |
| 3,444,469 | 5/1969 | Miyagi | 325/46 |

Primary Examiner—Albert J. Mayer
Attorney, Agent, or Firm—Howard P. Terry

[57] ABSTRACT

A laser data transmitter comprises a laser and a modulator coupled therewith for modulating the laser energizing current in accordance with the data. The modulator includes high frequency pre-emphasis circuitry for compensating the high frequency roll-off characteristics of the laser thereby providing a wide frequency bandwidth laser data transmitter.

5 Claims, 4 Drawing Figures

LASER DATA TRANSMITTER WITH WIDE FREQUENCY BANDWIDTH

BACKGROUND OF THE INVENTION

1. Field of the Invention

The invention pertains to laser data communication systems particularly with regard to a wide frequency bandwidth laser data transmitter.

2. Description of the Prior Art

The advantages of utilizing the coherent and highly directive light beam output of a laser for transmitting information are well known in the prior art. Lasers that are particularly suitable to perform communication functions are of the electrically energized carrier wave (cw) type. A commercially procurable laser of this variety is a helium-neon laser which includes an optical cavity and a gas tube through which a current is passed by the application of a suitable potential causing ionization of the gas and the consequent emission of a laser beam.

It is known in the art that the power output of such a laser may be varied from zero to 100 percent of its power capability by controlling the current through the tube. Accordingly, the laser beam has been amplitude modulated with information signals by connecting a current modulator in series with the laser tube and modulating the current through the tube in accordance with a data input signal. However, it has been found that the frequency at which the current through available laser tubes can be varied is limited by the shunt capacity of the tubes and possibly by the ionization-deionization phenomenon of the tubes. Thus such data transmitting configurations have been limited to narrow band signals such as audio data.

It has also been desirable to utilize the laser beam for the transmission of wide frequency bandwidth signals such as those required in television signal communication and in high speed digital data transmission. The high frequency rolloff characteristics of available lasers that are suitable for the communication function have heretofore prevented wide frequency bandwidth laser communication utilizing the heretofore described data modulation approach. Accordingly, for wide bandwidth laser transmissions, prior art communication systems have primarily utilized external light beam modulators for imparting the high frequency information signals to the laser beam. Such modulators operate by deflecting the narrow laser beam or varying the polarization thereof to achieve the required amplitude modulation at the high frequencies. Available optical modulators suitable for performing the high frequency beam modulation function are exceedingly expensive and bulky as well as requiring large amounts of high voltage modulation power. Such modulators are frequently many times more expensive than the lasers themselves.

Injection lasers often constructed of semiconductor material are also known in the prior art that normally provide fan-shaped beams. Although such lasers are readily modulated over wide frequency information bandwidths, bulky and expensive optical equipment is normally required to achieve sufficient beam collimation for data transmission over reasonable distances. Thus, such laser communication systems suffer from disadvantages of the type previously described.

SUMMARY OF THE INVENTION

The present invention provides an uncomplicated, inexpensive, lightweight and small sized device for imparting wide frequency bandwidth amplitude modulation to a laser beam without requiring large amounts of high voltage modulation power. This is achieved by a laser with a modulator coupled therewith for modulating the laser energizing current in accordance with the information signal to be transmitted, thus amplitude modulating the laser beam therewith. In accordance with the invention, the modulator includes high frequency pre-emphasis circuitry for compensating the high frequency rolloff characteristics of the laser thereby providing the wide frequency bandwidth laser data transmitter as desired.

DESCRIPTION OF THE PREFERRED EMBODIMENTS

Figure 1:
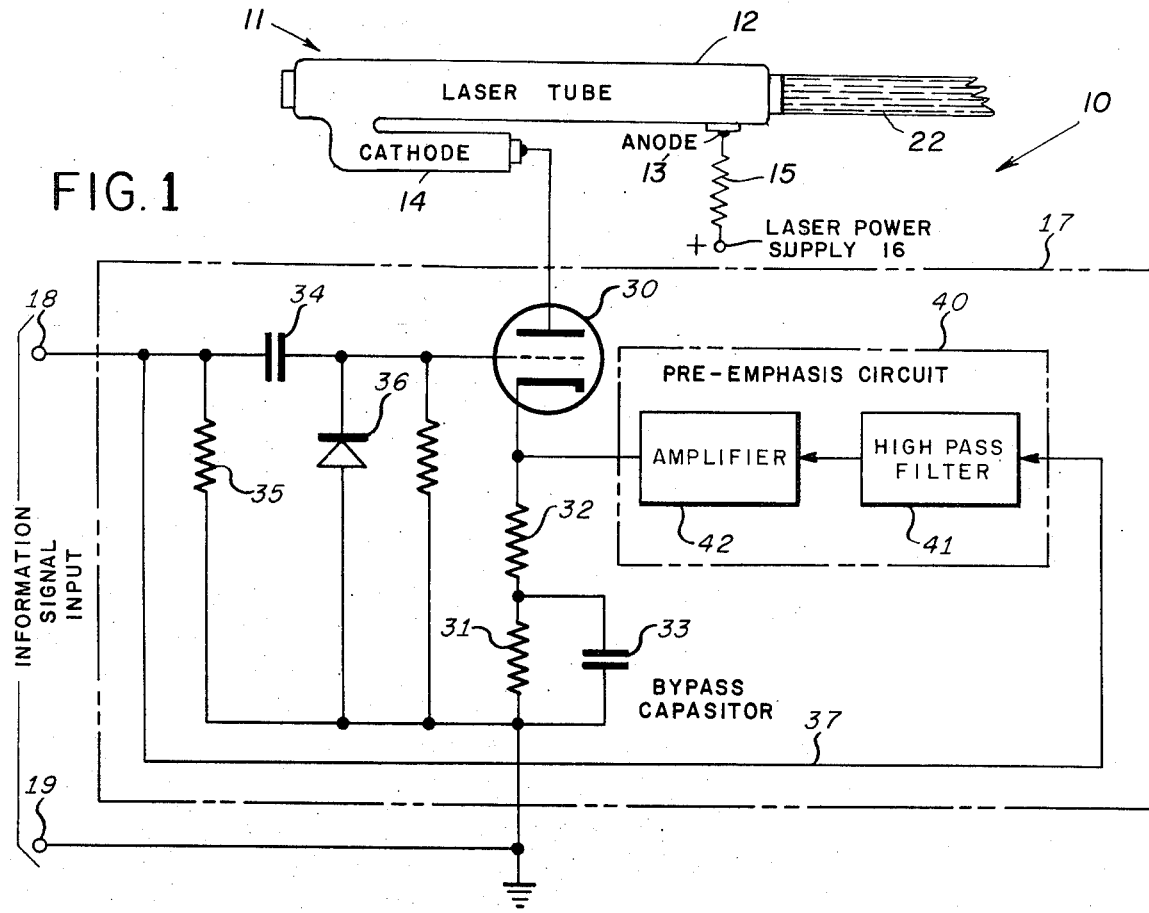
FIG. 1 is a schematic circuit diagram partially in block form of a preferred embodiment of a wide frequency bandwidth laser data transmitter instrumented in accordance with the concepts of the invention.

Referring to FIG. 1 a laser information signal transmitter 10 is illustrated. The transmitter 10 comprises a laser 11 which may be conveniently instrumented as a carrier wave (cw) gas laser of the commercially procurable helium-neon variety. Accordingly, the laser 11 comprises a gas tube 12 having an anode 13 and a cathode 14. The laser gas tube 12 receives its electrical energizing current via a conventional current limiting ballast resistor 15 from a laser power supply at a terminal 16. In the present embodiment of the invention the laser power supply applies a positive dc potential to the terminal 16 causing current to flow through the tube 12 via the ballast resistor 15.

The cathode 14 of the laser gas tube 12 is coupled to ground through a series circuit connected current modulator 17. The current modulator 17 provides a variable impedance between the cathode 14 and ground in accordance with an information signal applied to a terminal 18 with respect to a ground terminal 19. Thus the laser energizing current flowing through the laser tube 12 is amplitude modulated in accordance with the information signal applied at the terminal 18. The laser energizing current flowing through the tube 12 results in the generation of a laser beam 22 in a well known manner. The amplitude of the potential applied to the terminal 16 from the laser power supply and the resistance of the ballast resistor 15 are chosen such that the laser gas tube 12 can provide the laser beam 22 at a power level commensurate with the power capabilities of the laser 11 and the power requirements of the application to which the laser transmitter 10 is applied. Thus, it will be appreciated that in response to the information signal applied to the terminal 18 the laser beam 22 is amplitude modulated in accordance with the information content of the signal.

The signal applied to the terminal 18 may be provided, for example, from the video signal output of a conventional television camera or from the modulator-demodulator (MODEM) of a high-speed data transmission system. Conventional television video signals are normally approximately one volt peak-to-peak in amplitude and exhibit a frequency bandwidth of approximately 5 megahertz.

Figure 2:
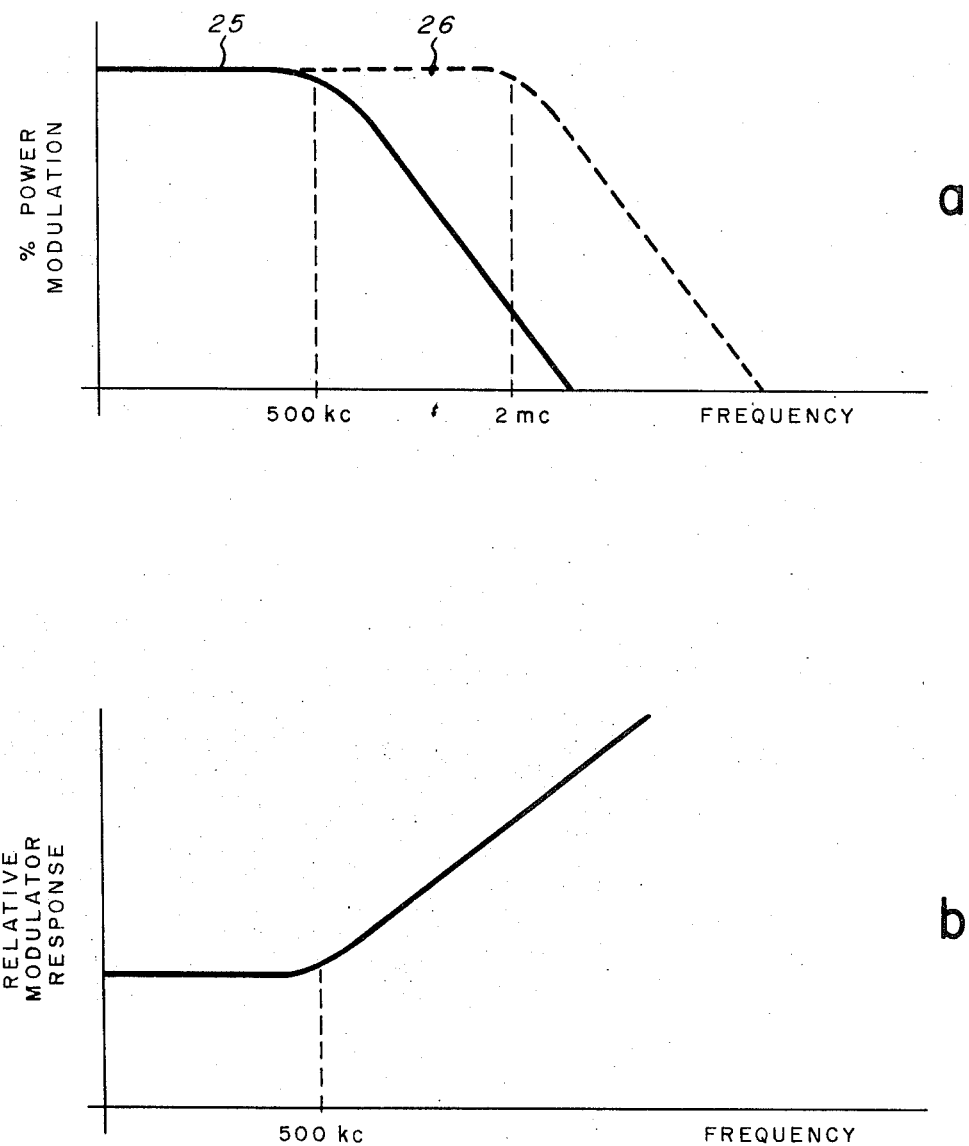
FIG. 2($a$–$b$) is a graph of laser and modulator characteristics useful in explaining the operation of the invention.

Referring now to FIG. 2, the frequency versus modulation characteristic of a typical helium-neon gas laser and series modulator is illustrated as the solid line curve 25 of FIG. 2a. Even with the current modulator having a flat frequency response into the megahertz region, the modulator-laser combination normally exhibits a high frequency rolloff beyond 500 kilohertz as illustrated.

In accordance with the invention, instead of utilizing a current modulator with a flat frequency response, circuitry is included with the modulator to provide high frequency pre-emphasis having a frequency characteristic inverse to the high frequency rolloff of the laser. Such a high frequency pre-emphasis characteristic is illustrated in FIG. 2b. Thus it is appreciated that by utilizing a current modulator with a high frequency pre-emphasis characteristic such as that illustrated in FIG. 2b, the dashed line frequency response curve 26 may be achieved for the laser. The curve 26 is reasonably flat out to 2 megahertz and therefore provides the wide frequency bandwidth desired.

Referring again to FIG. 1, the current modulator 17 is configured to provide high frequency pre-emphasis of the type illustrated in FIG. 2b. The current modulator 17 includes a high frequency, high gain modulator tube 30 connected in series circuit with the laser tube 12. The tube 30 may conveniently be instrumented as a triode amplifier of a variety such as the 2C39 triode type having small inter-electrode capacity. A resistor 31, coupling the cathode of the triode 30 to ground, provides self-bias for the tube such that the quiescent current flowing from the laser power supply at the terminal 16 through the laser tube 12, through the triode 30, through the cathode biasing resistor 31 and then to ground, results in approximately 5 to 10 percent of the maximum light output from the laser 11. Thus without any input signal applied to the triode 30, the laser energizing current remains substantially constant and a low power beam 22 is obtained from the laser 11. A low valued resistor 32 is connected in series between the cathode of the triode 30 and the self-bias resistor 31 for reasons to be explained. A conventional cathode bypass capacitor 33 is connected across the resistor 31 for reasons well understood in the electron tube circuits art.

As previously explained, the laser beam 22 may be modulated in accordance with a signal from a television camera applied to the terminal 18. The signal from the television camera may be of the standard 1 volt peak-to-peak sync negative type and is applied to the grid of the triode 30 through a coupling capacitor 34. An input resistor 35 is utilized to match the output impedance of the television camera which normally is approximately 75 ohms. Before being applied to the grid of the tube 30, the television signal is clamped to a −0.6 volt dc level by a diode 36. The negative tips of the sync pulses are clamped to this level, the remainder of the television signal varying positively therefrom. This arrangement prevents the television signal from driving the tube 30 to cutoff, thus stopping the lasing action of the laser tube 12 and provides a standard dc level to which the varying video signal may be referenced.

As well as being applied to the grid of the tube 30, the television signal applied to the terminal 18 is also connected via a lead 37 to a high frequency pre-emphasis circuit 40. The pre-emphasis circuit 40 is comprised of a high pass filter 41 which has the inverse attenuation slope of the laser and modulator circuit in the absence of pre-emphasis above the frequency at which the high frequency rolloff begins. The transfer characteristic of the high pass filter 41 is illustrated in FIG. 2b. The shaped signal from the high pass filter 41 is amplified and inverted in an inverting amplifier 42 and coupled into the cathode circuit of the tube 30 by means of the small valued resistor 32. The value of the resistor 32 is chosen sufficiently small to provide little degenerative feedback to the grid signal but sufficiently large to accept the cathode signal applied from the amplifier 42. This inverted cathode signal is amplified in the triode 30 as is the signal on the grid thereof but at a lower gain and provides high frequency pre-emphasis for the modulator 17 by reason of the shaping filter 41. Thus the high frequency response of the laser 11 and the modulator 17 is extended in accordance with the curve 26 of FIG. 2a as desired in practicing the invention.

It will be appreciated that the use of the separate cathode and grid drive points to the tube 30 has the advantage that the phase characteristics of the high pass filter 41 at the lower frequencies is inconsequential, which would not be so if it were attempted to design a single filter with a flat response at the low frequencies and a rising response at the higher frequencies.

Figure 3:
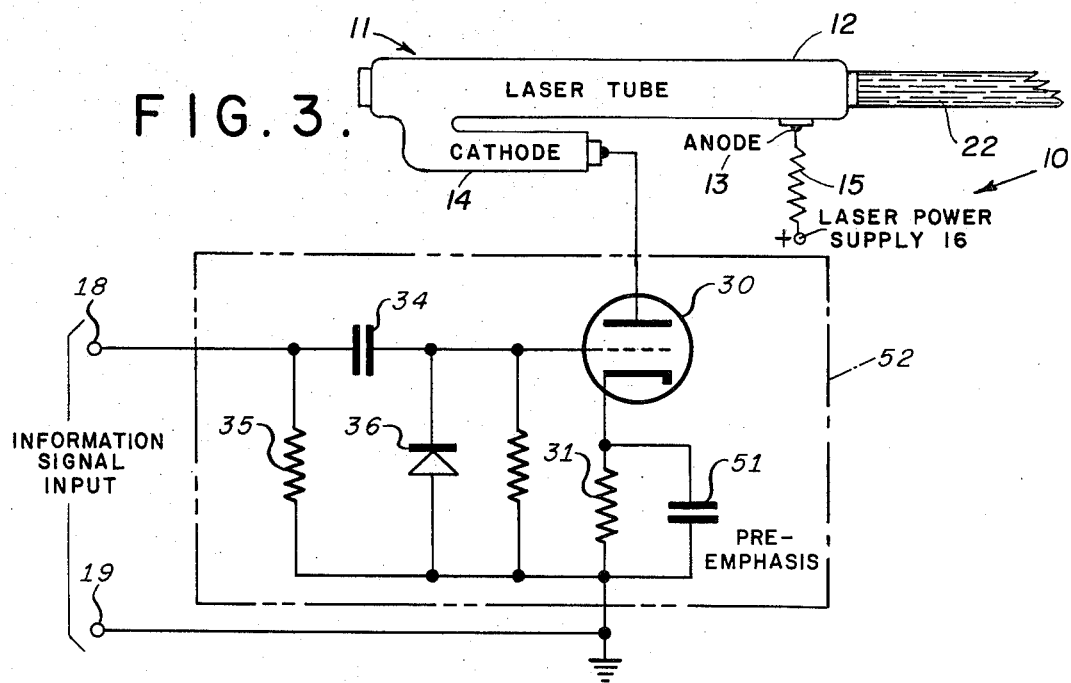
FIG. 3 is a schematic circuit diagram of another embodiment of a laser data transmitter with a wide frequency bandwidth.

The circuit illustrated in FIG. 1 provides sufficient bandwidth for most television and data transmission applications. FIG. 3 illustrates a circuit that provides a somewhat narrower bandwidth compared to that of the FIG. 1 circuit but is somewhat more economical to manufacture. The bandwidth provided by the FIG. 3 circuit is adequate for many closed circuit television applications and for data transmission.

Referring now to FIG. 3, in which like reference numerals indicate like components with respect to FIG. 1, a laser data transmitter 50 is illustrated. The apparatus 50 is the same as that illustrated in FIG. 1 except that the lead 37, the high frequency pre-emphasis circuit 40 and the coupling resistor 32 are removed and high frequency pre-emphasis is achieved by the capacitance value selected for the bypass capacitor across the resistor 31. Accordingly, a cathode bypass capacitor 51 is connected across the self-biasing resistor 31 and is selected to have an impedance such that bypassing is incomplete at the lower frequencies thereby providing a degree of degenerative feedback at the lower frequencies. At the higher frequencies, bypassing is complete thus providing maximum gain. Therefore by this means the current modulator 52 is provided with high frequency pre-emphasis in accordance with the invention.

As previously mentioned, the apparatus of FIGS. 1 and 3 may be utilized in a digital data link for transmission of high speed digital data. In such an application, the data is applied to the terminal 18 and the clamping diode 36 is removed. The value of the resistor 35 is adjusted to match the impedance of the data input source.

The current modulators 17 and 52 of FIGS. 1 and 3, respectively, have been explained in terms of a vacuum tube triode 30. It will be appreciated that other tube types as well as transistors may be utilized in practicing the invention. The current modulators 17 and 52 are illustrated connected in series circuit with the cathode 14 of the laser tube 12. It will be appreciated that the modulators may also be connected in series circuit with the anode 13 of the laser tube 12 in practicing the invention. Although the current modulators 17 and 52 are illustrated in series with the laser tube 12, it will be appreciated that the current modulator may also be connected as a shunt modulator thereacross.

The above-described embodiments of the invention have been explained in terms of a high frequency pre-emphasis circuit connected into the cathode of the modulator tube 30. It will be appreciated that another embodiment of the invention may be realized by connecting the pre-emphasis circuit in series with the grid of the tube 30 or, alternatively, having pre-emphasis in both the grid and cathode circuits thereof. Connecting pre-emphasis circuits in both the grid and cathode circuits of the tube 30 may provide an even further desirable increase in bandwidth. It would be required, however, to maintain the cathode and grid signals 180° phase displaced with respect to each other within a small phase differential over the frequency range of interest.

The invention has been explained in terms of a helium-neon gas laser 11. It will be appreciated that other lasers may be utilized to the same effect in practicing the invention. The embodiments of the invention have been illustrated with the ballast resistor 15 in series with the laser tube 12 to limit the current therethrough. It will be understood that the embodiments of the invention may be operable without a ballast resistor with the current modulator tube 30 providing the function thereof. Some improvement in frequency response may be realized if the current through the laser tube 12 is not limited by a ballast resistor.

From the foregoing it will be appreciated that the apparatus described is relatively uncomplicated, inexpensive and can operate directly from the signal power levels available from television cameras and the like. The circuit only requires filament power for the modulator tube 30 in addition to the basic laser power applied to the terminal 16. The circuit occupies no more than several cubic inches of volume, making it possible to install a closed circuit tv. laser transmitter at the same location as the tv. camera, which may be part of a remote and inaccessible installation. Adjustments are not necessary in the apparatus of the invention and the nominal amount of ac or dc filament power required by the modulator tube makes it feasible to operate the apparatus on battery power with perhaps solar cell chargers, which installation is unfeasible with conventional optical modulators. Thus, the present invention makes possible a completely isolated tv camera/transmitter combination for remote or difficult to reach locations for security surveillance, traffic surveillance and the like. Additionally, the invention may be utilized in applications requiring temporary closed circuit television where the cost of installing cables or microwave transmitters is prohibitive. Such an installation may be required across a heavily travelled roadway or across a narrow channel or river.

In closed circuit television installations, a significant portion of the cost thereof occurs because of the requirement of transmitting the television signals between separated locations. The television signal transmission expenses are not so much related to the transmission distances involved but rather to the environment over which the transmission must occur. For example, it is exceedingly expensive to install a cable under a major traffic thoroughfare in an urban area as compared to the expense of installing a considerably longer length of cable in available ducts or conduits. The use of microwave links for transmitting the signals is also undesirable, not only because of the excessive expense of the microwave equipment but because the frequency spectrum available for the microwave channels is rapidly approaching saturation. The present invention therefore provides a highly desirable solution to these problems.

Although the present invention is eminently suited to the use as a closed circuit television transmitter, it also provides a desirable high speed data transmission system. A typical application would be in short range data links from users of common carrier data microwave services to a local collection-distribution location for tie-in to inter-city relays. The lack of sufficient microwave channel availability and the cost of microwave cable installations renders the use of the present invention highly advantageous.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A laser transmitter for transmitting information signals from an information signal source comprising
   a carrier wave laser for providing a laser beam of intensity proportional to the electrical energizing current passed through said laser,
   modulator means responsive to said information signal and coupled with said laser for amplitude modulating said energizing current in accordance with said information signal thereby amplitude modulating said laser beam in accordance with said information signal,
   said laser exhibiting a high frequency rolloff in its frequency versus percent amplitude modulation characteristic of said beam with regard to said energizing current, and
   pre-emphasis means coupled with said modulator means for providing high frequency pre-emphasis with respect to said information signal, said high frequency pre-emphasis having an inverse characteristic to that of said high frequency rolloff for providing a wide frequency bandwidth laser information signal transmitter with a substantially flat frequency response over said wide frequency bandwidth.

2. The transmitter of claim 1 in which said modulator means comprises a current modulator connected in series circuit with said laser.

3. The transmitter of claim 2 in which said current modulator comprises a high frequency, high gain triode including cathode, anode and control grid electrodes, said cathode and anode electrodes being connected in series circuit with said laser for passage of said energizing current therebetween and said control grid electrode being coupled to receive said information signal for amplitude modulation of said energizing current in accordance therewith, and said pre-emphasis means comprises a high pass shaping filter coupled to receive said information signal for shaping said information signal in accordance with said inverse characteristic and coupled to provide said shaped signal to said cathode electrode thereby providing said high frequency pre-emphasis.

4. The transmitter of claim 2 in which said current modulator comprises a high frequency, high gain triode including cathode, anode and control grid electrodes, said cathode and anode electrodes being connected in series circuit with said laser for passage of said energizing current therebetween and said control grid electrode being coupled to receive said information signal for amplitude modulation of said energizing current in accordance therewith, and said pre-emphasis means comprises a bypass capacitor in series circuit with said cathode of such impedance that bypassing is incomplete at the lower frequencies thereby providing said high frequency pre-emphasis.

5. A laser transmitter for transmitting information signals from an information signal source comprising a carrier wave gas laser including a gas tube for providing a laser beam of intensity proportional to the electrical energizing current passed through said gas tube, a high frequency, high gain triode current modulator including cathode, anode and control grid electrodes, said cathode and anode electrodes being connected in series circuit with said gas tube for passage of said energizing current therebetween and said control grid electrode being coupled to receive said information signal for amplitude modulating said energizing current in accordance with said information signal thereby amplitude modulating said laser beam in accordance with said information signal, said laser exhibiting a high frequency rolloff in its frequency versus percent amplitude modulation characteristic of said beam with regard to said energizing current, and pre-emphasis means comprising a high pass shaping filter coupled to receive said information signal for shaping said information signal in accordance with a characteristic inverse to that of said high frequency rolloff and coupled to provide said shaped signal to said cathode electrode for providing high frequency pre-emphasis with respect to said information signal to provide a wide frequency bandwidth laser information signal transmitter with a substantially flat frequency response over said wide frequency bandwidth.

* * * * *